(No Model.) 8 Sheets—Sheet 1.

C. E. FELTON.
HEATING AND VENTILATING PRISONS OR OTHER BUILDINGS.

No. 370,011. Patented Sept. 13, 1887.

Witnesses:

Inventor:
Charles E. Felton
By Munday, Evarts & Adcock
his Attorneys (No Model.) 8 Sheets—Sheet 3.

C. E. FELTON.
HEATING AND VENTILATING PRISONS OR OTHER BUILDINGS.

No. 370,011. Patented Sept. 13, 1887.

(No Model.)   8 Sheets—Sheet 4.

C. E. FELTON.
HEATING AND VENTILATING PRISONS OR OTHER BUILDINGS.

No. 370,011.   Patented Sept. 13, 1887.

(No Model.) 8 Sheets—Sheet 6.
C. E. FELTON.
HEATING AND VENTILATING PRISONS OR OTHER BUILDINGS.
No. 370,011. Patented Sept. 13, 1887.

(No Model.) 8 Sheets—Sheet 7.
C. E. FELTON.
HEATING AND VENTILATING PRISONS OR OTHER BUILDINGS.
No. 370,011. Patented Sept. 13, 1887.

(No Model.) 8 Sheets—Sheet 8.

C. E. FELTON.
HEATING AND VENTILATING PRISONS OR OTHER BUILDINGS.

No. 370,011. Patented Sept. 13, 1887.

UNITED STATES PATENT OFFICE.

CHARLES E. FELTON, OF CHICAGO, ILLINOIS, ASSIGNOR TO HIMSELF AND HERBERT A. STREETER, OF SAME PLACE.

HEATING AND VENTILATING PRISONS OR OTHER BUILDINGS.

SPECIFICATION forming part of Letters Patent No. 370,011, dated September 13, 1887.

Application filed November 3, 1886. Serial No. 217,880. (No model.)

*To all whom it may concern:*

Be it known that I, CHARLES E. FELTON, a citizen of the United States, residing at Chicago, in the county of Cook and State of Illinois, have invented a new and useful Improvement in Heating and Ventilating Prisons or other Buildings, of which the following is a specification.

This invention relates to the heating and ventilating of prisons or other structures, where the tiers of cells or dormitories have an open hall or corridor, without separation by floors or otherwise into separate stories of halls or corridors to each story of cells or dormitories.

In the accompanying drawings, which form a part of this specification, and in which similar letters of reference indicate like parts, I have represented a portion of a prison embodying my invention.

In said drawings.

Figure 1:
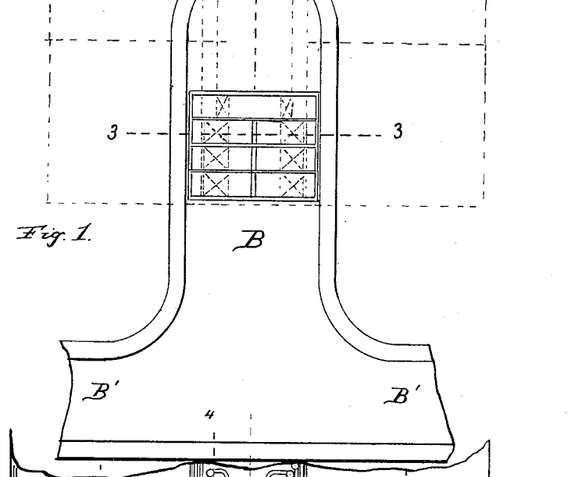
Figure 1 is a plan view showing the fresh-air conduit in the basement of the building below the first tier of cells.
Figure 2:
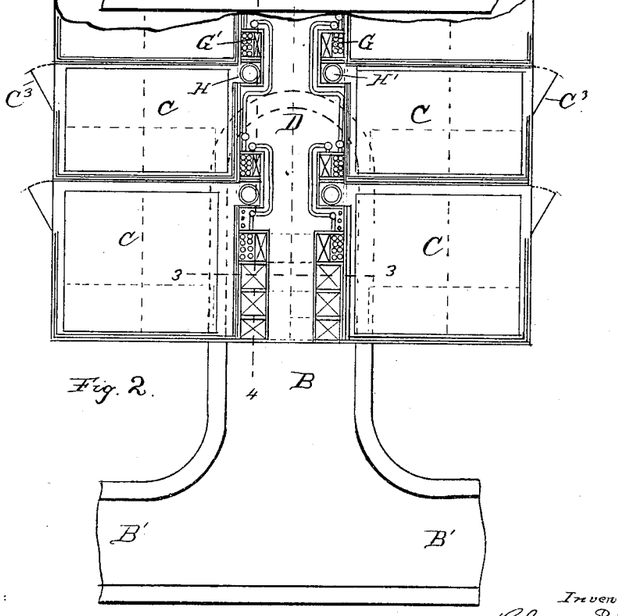
Fig. 2 is a plan showing the first tier of cells.
Figure 3:
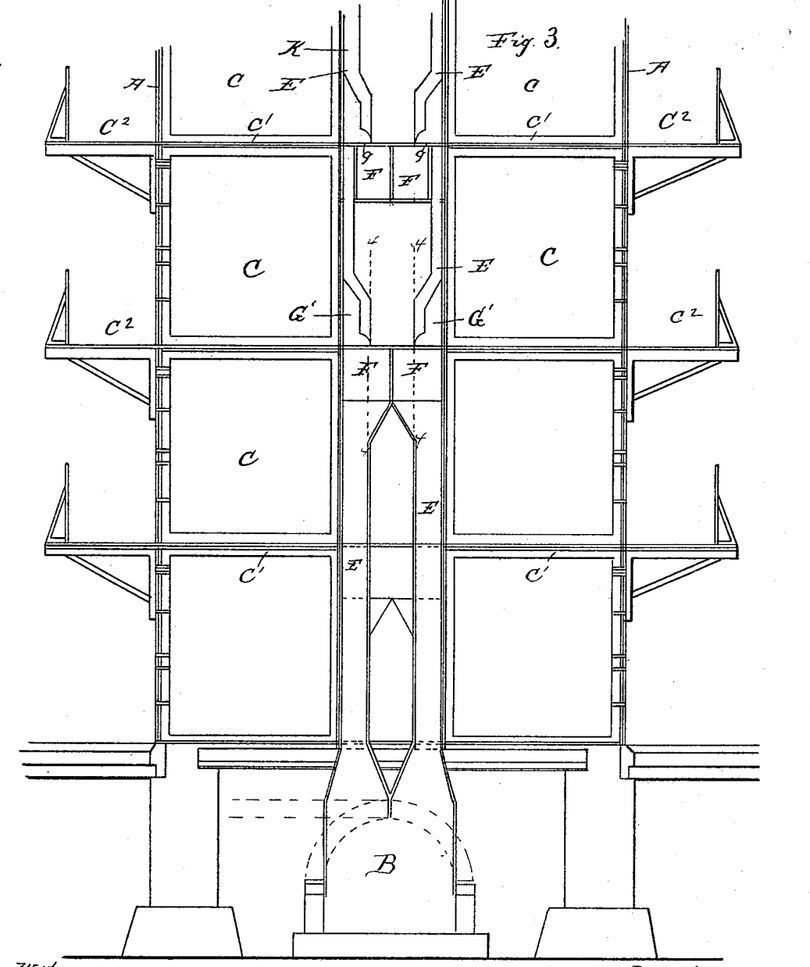
Fig. 3 is a vertical cross-section on line 3 3 of Fig. 1. The section-line 3 3 is also marked on Fig. 2.
Figure 4:
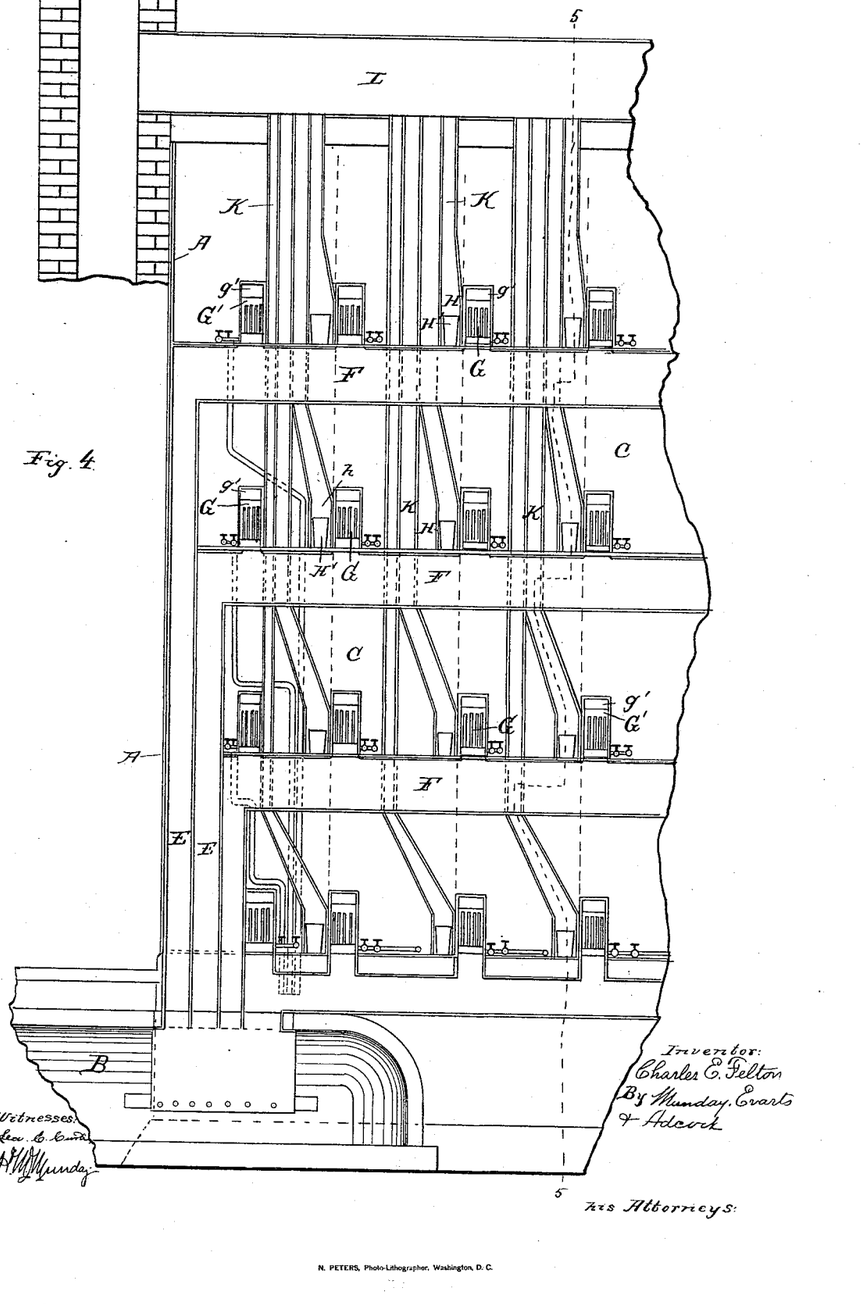
Fig. 4 is a vertical longitudinal section on line 4 4 of Fig. 2. The section-line 4 4 is also marked on Fig. 3.
Figure 5:
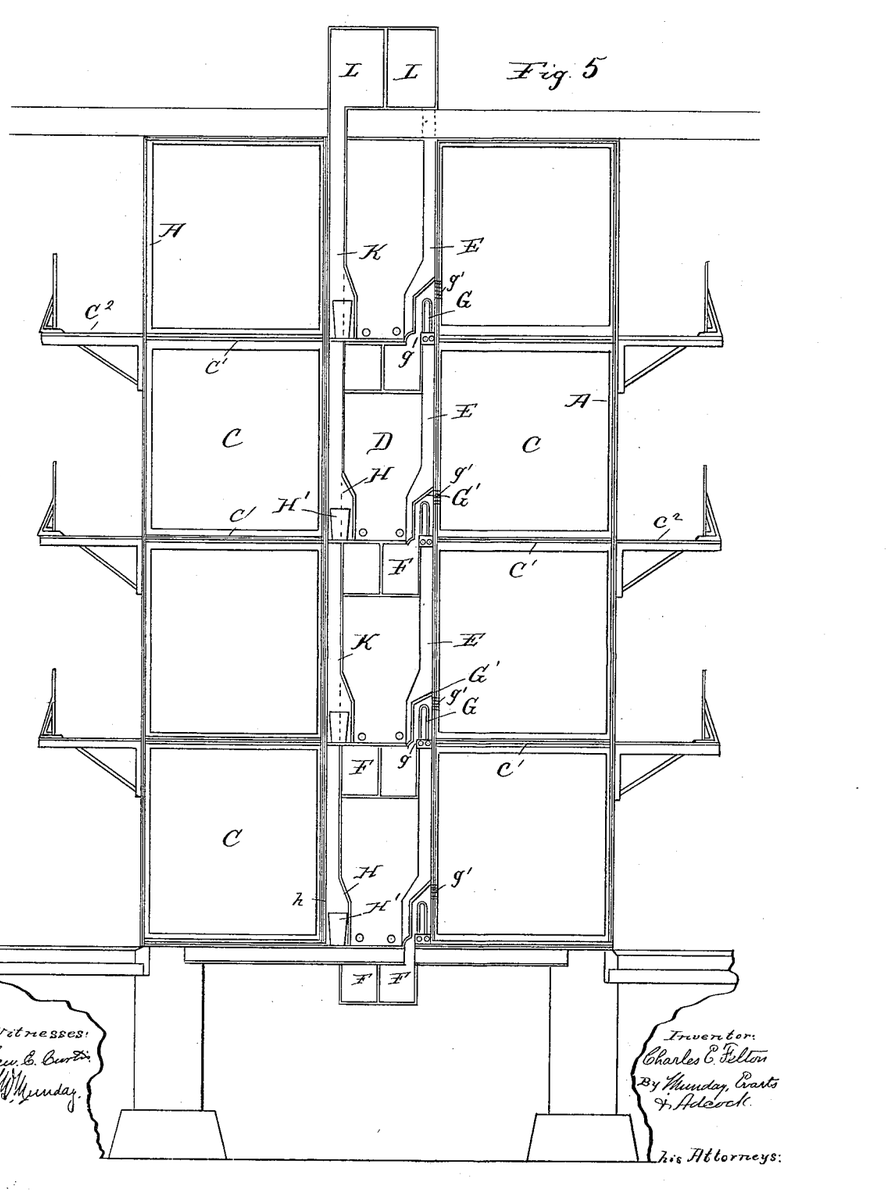
Fig. 5 is a section on line 5 5 of Fig. 4.
Figure 6:
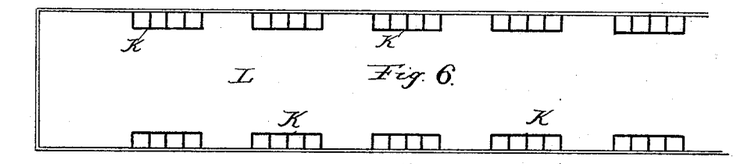
Fig. 6 is a horizontal section of the foul-air conduit above the cells.
Figure 7:
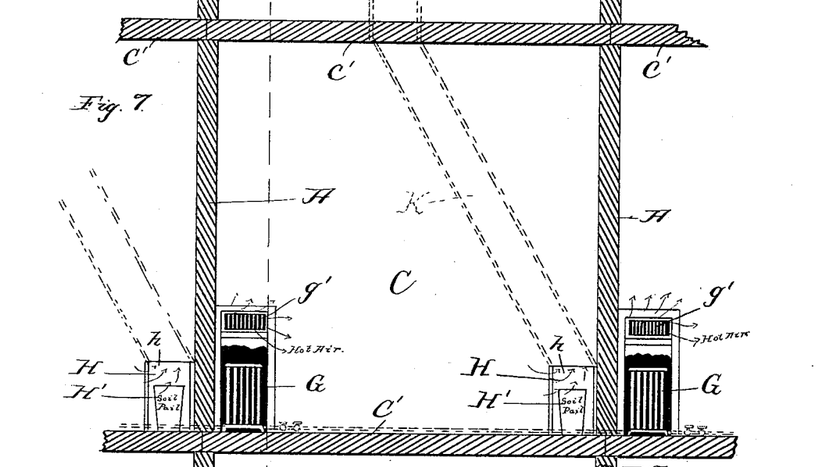
Fig. 7 is an enlarged detail vertical section through one of the cells, the back wall of the cell being partially broken away to show the location of the heater.
Figure 8:
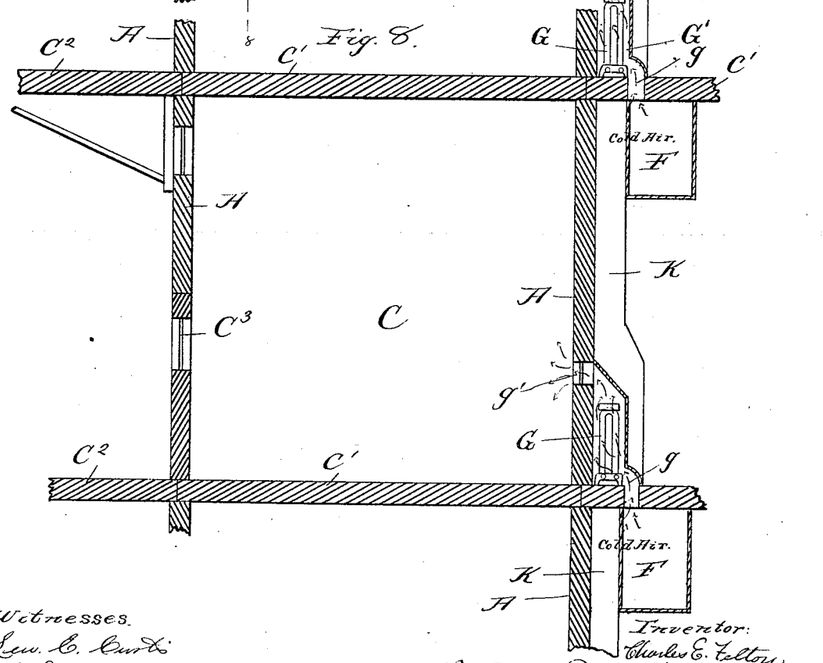
Fig. 8 is a vertical section on line 8 8 of Fig. 7.
Figure 9:
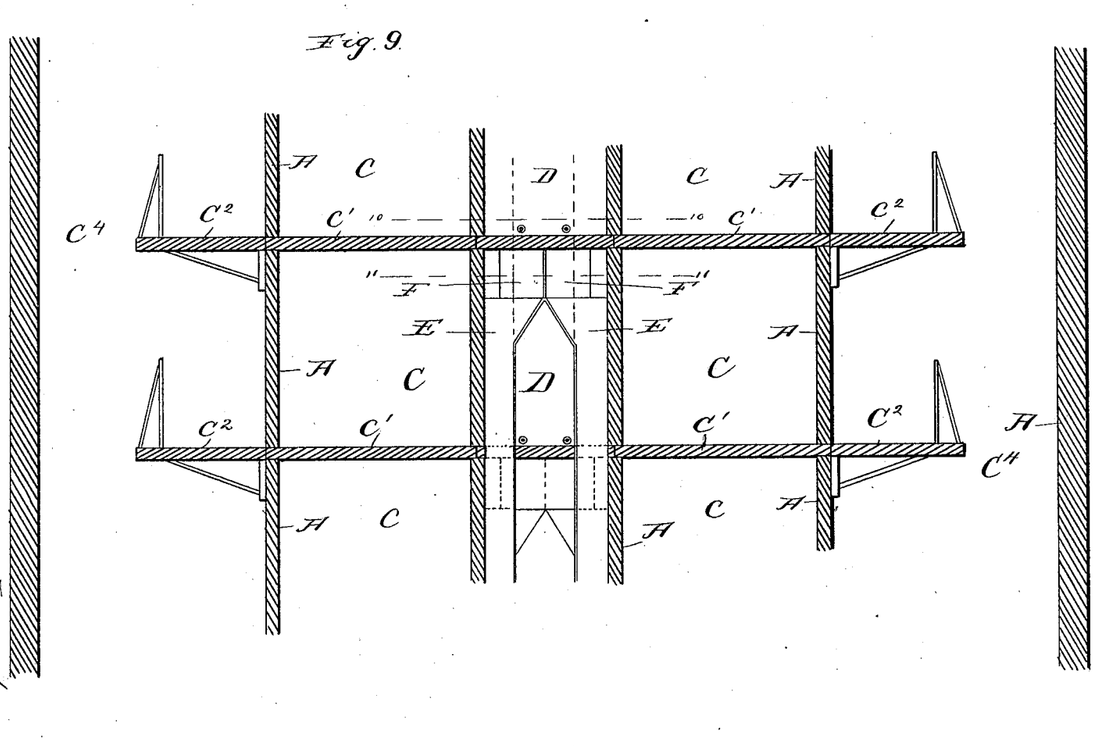
Fig. 9 is an enlarged partial vertical section similar to Fig. 5, but showing only one floor or tier of cells.
Figure 10:
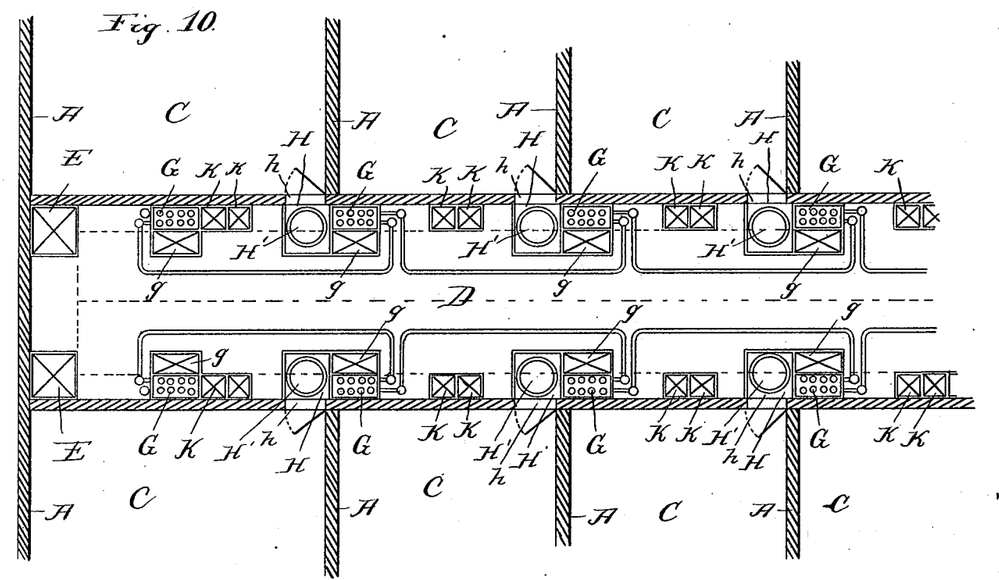
Fig. 10 is a partial horizontal section on line 10 10 of Fig. 9.
Figure 11:
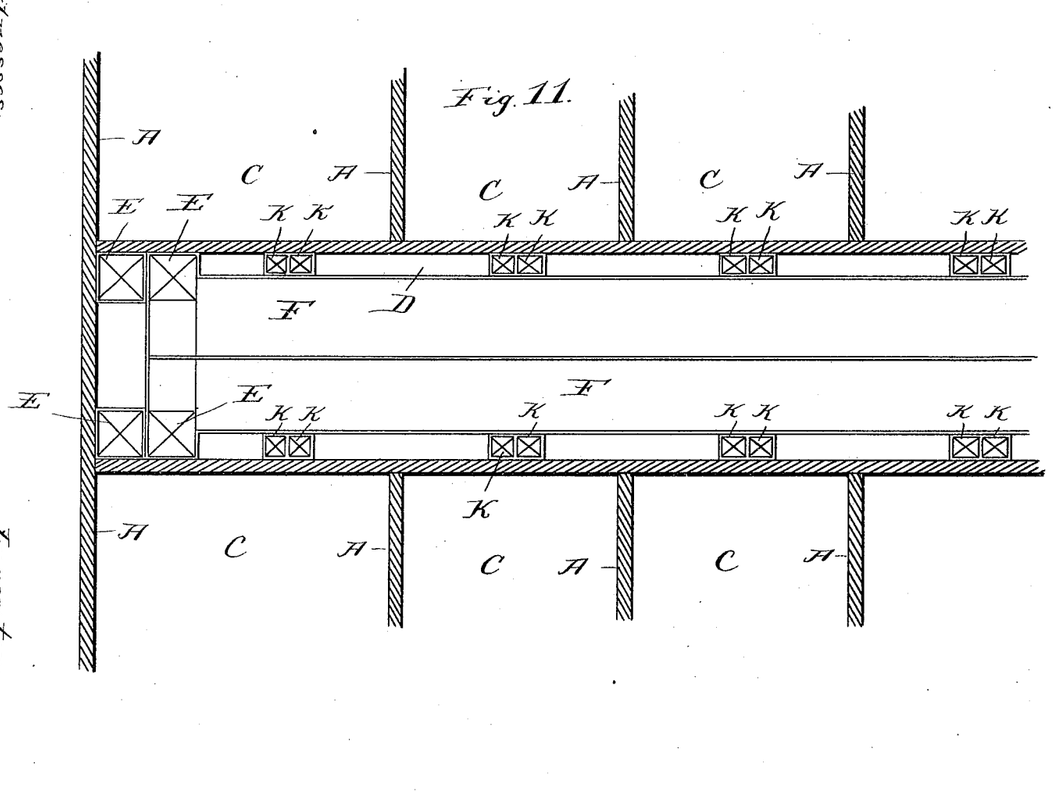
Fig. 11 is a partial horizontal section on line 11 11 of Fig. 9.

In said drawings, A represents the walls of the prison. B is the main fresh-air conduit, having preferably two branches, B' B', communicating with the outer air. This conduit may be of masonry, and should be large enough to afford an ample supply of fresh air to all the cells of the prison. The cells C are arranged in tiers in two rows, with a heating and ventilating chamber, D, extending longitudinally between them.

C' C' represent the floors and ceilings between the tiers of cells.

$C^2$ $C^2$ are balconies projecting out at each side of the rows of cells into the open hall or corridor $C^4$, surrounding the cells or dormitories, which hall or corridor is not divided into separate floors or stories.

$C^3$ represents the open gratings at the fronts or doors of the cells. The conduit B should be directly under the heating and ventilating chamber D, and said chamber is furnished with a series of vertical fresh-air ducts, E, leading from said conduit to horizontal fresh or cold air ducts F, there being two such vertical ducts and two horizontal ducts for each floor or tier of cells. The cold-air ducts F F extend horizontally along the heating and ventilating chamber D, one on each side of said chamber, adjacent to the cells and directly beneath the floor.

As shown in the drawings, there being four or more floors or tiers of cells, there are four or more of these cold-air horizontal ducts and four pairs of vertical ducts E E leading from the main conduit B to said cold-air ducts. The vertical fresh-air ducts E E are of course of different lengths, those which open into the cold-air horizontal ducts F F for the lower tier of cells being the shortest and those which open into the cold-air horizontal ducts of the upper tier of cells being the longest.

Each cell or dormitory is furnished with a heating device, G, preferably a steam-coil located outside the cell or dormitory in the heating and ventilating passage D, preferably near one of the rear corners of the cell or dormitory. This heating device, radiator, or steam-coil is inclosed by a case, G', having an opening or passage, $g$, communicating at or near its base with the cold-air flue F for its tier and row of cells. The back plate or wall of the cell adjoining the steam-coil is furnished with an opening or openings, $g'$, through which the fresh air, after being heated by the steam-coil, passes from the opening or passage $g$ into the cell. The vertical fresh-air ducts E E are all located and arranged in the heating and ventilating passage D, between the two rows of cells.

H represents the closet or receptacle, with which the cell is provided, for the soil-pan or water-closet H'. The rear plate or wall of the cell, at or near the bottom thereof, is furnished with a door, opening, or passage, $h$, leading into the closet or receptacle H.

K is a foul-air flue leading from the top of the receptacle H to the main foul-air conduit L at the top of the building, or above the cells. The closet or receptacle H may preferably be simply an enlargement of the foul-air flue K at its base. The foul-air outlet $h$ is, or should be, located at the opposite rear corner of the cell from the fresh-air inlet $g'$. The foul-air flues K K—one for each separate cell or dormitory—are of course of different lengths, those for the upper tier of cells being the shortest, while those for the lower tier of cells are the longest. Part of these foul-air flues—those for the right-hand row of cells—are located on the right-hand side of the heating and ventilating passage or chamber D, and part—those for the left-hand row of cells—are on the left side of said passage D. As all the heating apparatus and fresh and foul air ducts and flues are arranged in this common heating and ventilating chamber D, they are conveniently accessible for repairs, cleaning, &c. The foul-air conduits L L should preferably be two in number, one for each row of cells, and communicate with an adequate draft-producing device, N, such as a hot-air flue, suction-fan, or other device. In the drawings I have shown my invention as applied to a prison. It may, however, be used in connection with other buildings or structures containing a series of rooms or cells arranged in tiers.

The open hall or corridor $C^4$, surrounding the block of cells C, is inclosed by the outer wall of the building or prison. The cells C are arranged in tiers one above another, and in two rows extending longitudinally of the building, the doors of the cells opening out on the balconies $C^2$, which project out into the open hall or corridor $C^4$, surrounding the block of cells. Between the two rows of cells on each floor is the long continuous heating and ventilating chamber D. The same floors and ceilings which separate the tiers of cells C from each other also divide the heating and ventilating chambers horizontally. Two cold or fresh air ducts, F and F, extend horizontally along the heating and ventilating chamber D for each tier or story of cells C, one of said ducts supplying fresh air to the cells on one side of the heating and ventilating chamber D and the other duct the cells on the opposite side. A separate vertical fresh-air duct, E, leads from the main fresh-air conduit B to each of the horizontal fresh-air ducts F, so that each tier or story of cells and each row of cells has its own direct and separate supply of fresh air. Each cell C has a direct and separate communication through the openings $g$ $g'$ with its horizontal fresh-air duct F. The separate heater G for each cell is located in the heating and ventilating chamber D just outside the cell, and the fresh air from the opening $g$ in fresh-air duct F passes through or around the heater before entering the cell through the opening or air-passage $g'$ in the wall A of the cell. The shell or casing G' of the heater serves to conduct the fresh air from the duct F into the cell. The foul-air flues K—one for each cell C—all extend vertically upward from the cell to the main horizontal foul-air conduit L or L, near the top of the building.

I claim—

1. In a prison or other building having a series of cells or dormitories arranged in tiers, with a common hall or corridor for the several tiers of cells, the heating and ventilating system consisting in the combination of such cells or dormitories, with a heating and ventilating chamber extending horizontally between the several floors at the rear of each row of cells or dormitories, a cold-air conduit below said cells, fresh-air conductors leading from said conduit, located in said heating and ventilating chamber and communicating directly with each of the cells or dormitories, and foul-air conductors leading directly from each of said cells and dormitories and located in said heating and ventilating chamber, substantially as specified.

2. In a prison or other building having a series of cells or dormitories arranged in tiers, with a common hall or corridor for the several tiers, the heating and ventilating system consisting in the combination of cells or dormitories, a heating and ventilating chamber extending horizontally between the several floors at the rear of each row of cells or dormitories, a cold-air conduit at the base of the building below the cells, fresh-air conductors leading from said conduit, located in said heating and ventilating chamber and communicating directly with each of the cells or dormitories, and foul-air conductors in said heating and ventilating chamber and leading directly from each of said cells or dormitories, and heaters or radiators in said heating and ventilating chamber for and adjoining each cell or dormitory, through which the fresh air passes, and closet or receptacle H at the mouth or base of said foul-air conductors, all said conductors, heaters, and closets or receptacles being located and arranged in said heating and ventilating chamber, substantially as specified.

3. In a prison or other structure, the combination of a series of cells or dormitories arranged in tiers and rows, with a heating and ventilating chamber between the back or rear walls of two contiguous rows of cells, and extending horizontally the length of said rows of cells between the several floors, a fresh or cold air conduit below said cells, a series of horizontal fresh or cold air ducts in said heating and ventilating chamber, one or more for each floor or tier of cells or dormitories, a series of fresh-air vertical ducts in said heating and ventilating chamber, leading from said conduit to said cold-air horizontal ducts, one or more for each floor or tier of cells, a heating device for and adjoining each cell or dormitory having an inclosing-case communicating with the interior of the cell or dormitory and its cold-air duct, and a series of foul-air flues leading from said cells or dormitories to a foul-air conduit provided with an exhaust or draft device, substantially as specified.

4. The combination of cells or dormitories C, arranged in rows and tiers, with a common heating and ventilating chamber, D, between the two rows of said cells or dormitories, conduits B, fresh-air ducts E, fresh-air ducts F, steam-coil G, case G', having openings $g$ and $g'$, foul-air flues K, having enlargements or receptacles H at their base furnished with openings $h$, leading into said cells or dormitories, and main foul-air conduit L, communicating with a draft or exhaust device, substantially as specified.

CHAS. E. FELTON.

Witnesses:
H. M. MUNDAY,
EDMUND ADCOCK.